United States Patent [19]

Hans et al.

[11] Patent Number: 5,594,606

[45] Date of Patent: Jan. 14, 1997

[54] DISK STORAGE DRIVE FOR MAINTAINING PRECISION DURING THERMAL VARIATIONS

[75] Inventors: Helmut Hans; Jürgen Oelsch, both of St. Georgen, Germany

[73] Assignee: Papst Licensing GmbH, Germany

[21] Appl. No.: 390,936

[22] Filed: Feb. 17, 1995

Related U.S. Application Data

[63] Continuation of Ser. No. 883,029, May 14, 1992, abandoned.

[30] Foreign Application Priority Data

Jun. 29, 1991 [DE] Germany ............... 41 21 425.0

[51] Int. Cl.$^6$ ............... G11B 17/02; H02K 5/16
[52] U.S. Cl. ............... 360/99.08; 369/269; 310/67 R; 310/90; 310/154
[58] Field of Search ............... 369/266, 269; 360/99.04, 99.08, 98.07, 99.09, 99.11; 310/46, 66, 67 R, 68 C, 90, 42, 154, 156

[56] References Cited

U.S. PATENT DOCUMENTS

| | | | |
|---|---|---|---|
| 3,822,602 | 7/1974 | Holmes et al. | 74/5 R |
| 4,658,312 | 4/1987 | Elsässer et al. | 360/97 |
| 4,739,427 | 4/1988 | Kilmer et al. | 360/97 |
| 4,779,165 | 10/1988 | Elsaesser et al. | 360/97 |
| 4,797,762 | 1/1989 | Levy et al. | 360/99.06 |
| 4,814,652 | 3/1989 | Wright | 360/98.07 |
| 4,853,567 | 8/1989 | Muramatsu et al. | 310/67 R |
| 4,853,839 | 6/1989 | Forbes et al. | 29/596 |
| 4,998,033 | 3/1991 | Hisabe et al. | 310/67 R |
| 5,001,581 | 3/1991 | Elsässer et al. | 360/97.02 |
| 5,006,943 | 4/1991 | Elsässer et al. | 360/99.08 |
| 5,040,085 | 8/1991 | Elsässer et al. | 360/98.07 |
| 5,045,738 | 9/1991 | Hishida et al. | 310/90 |
| 5,047,677 | 9/1991 | Mineta et al. | 310/67 R |
| 5,091,809 | 2/1992 | Connors et al. | 360/99.08 |
| 5,138,209 | 8/1992 | Chuta et al. | 310/67 R |
| 5,160,865 | 11/1992 | Gururangan | 310/67 R |
| 5,173,814 | 12/1992 | Elsasser et al. | 360/98.07 |
| 5,216,557 | 6/1993 | Elsaesser et al. | 360/99.08 |
| 5,227,686 | 7/1993 | Ogawa | 310/90 |
| 5,243,242 | 9/1993 | Cap et al. | 310/67 R |
| 5,256,926 | 10/1993 | Hagenlocher et al. | 310/259 |
| 5,446,610 | 8/1995 | Elsaesser et al. | 360/99.08 |

FOREIGN PATENT DOCUMENTS

| | | |
|---|---|---|
| W88/06781 | 9/1988 | European Pat. Off. . |
| 0402240A1 | 12/1990 | European Pat. Off. . |
| 965860 | 9/1950 | France . |
| 136683 | 7/1979 | Germany . |
| 3135385A1 | 3/1983 | Germany . |
| 3538480A1 | 4/1986 | Germany . |
| 3542542A1 | 6/1987 | Germany . |
| 3818994A1 | 12/1988 | Germany . |
| 57-105863A | 7/1982 | Japan . |
| 60-256983A | 12/1985 | Japan . |
| 61-242378 | 10/1986 | Japan . |
| 3-198640A | 8/1991 | Japan . |
| 216465 | 5/1924 | United Kingdom . |
| 415794 | 9/1934 | United Kingdom . |
| 996919 | 6/1965 | United Kingdom . |
| 2166586 | 5/1980 | United Kingdom . |
| 2202386 | 9/1988 | United Kingdom . |

*Primary Examiner*—Stuart S. Levy
*Assistant Examiner*—Paul J. Ditmyer
*Attorney, Agent, or Firm*—Fitch, Even, Tabin & Flannery

[57] ABSTRACT

A disk storage drive is provided with a brushless drive motor having a stator (34) with a winding. An external rotor housing (32) including a permanent magnet (33) coaxially surrounds the stator and is spaced therefrom by a substantially cylindrical air gap. A hub (31) is provided that is concentric to the rotor housing (32) and is connected to the rotor housing for rotation therewith. A bearing (47) above the stator rotatably supports an upper end of the rotor housing on a stationary shaft (46) and a bearing (37) below the stator braces the open end of the rotor housing by a ring element (35) having substantially the same heat expansion characteristics as the rotor housing (32).

13 Claims, 1 Drawing Sheet

DISK STORAGE DRIVE FOR MAINTAINING PRECISION DURING THERMAL VARIATIONS

This application is a continuation of application Ser. No. 07/883,029, filed May 14, 1992 now abandoned.

BACKGROUND OF THE INVENTION

The invention pertains to a disk storage drive with a brushless dc driving motor that comprises a stator provided with a winding and an outer rotor with a permanent magnetic rotor magnet that encompasses the stator and forms an essentially cylindrical air gap, as well as a hub that is connected with the rotor magnet in a nonrotating manner and is provided with a disk carrier section that can be stuck through a central opening of the storage disk in order to serve as a receptacle for at least one storage disk arranged in a clean room, whereby at least half of the axial longitudinal extent of the stator winding and the motor magnet interacting with the same are held within the space enclosed by the plate carrier section of the hub, and whereby the rotor and the hub are supported in a rotatable manner on a stationary shaft by a bearing arrangement with a first bearing.

Such a drive is known from DE-OS 3,818,994.

Certain problems exist with such devices or drives for such devices, namely that the extreme precision requirements in regard to the quality constant must be fulfilled even at changing temperatures which represents a particularly frequent problem with hard disk storage drives.

This invention is based on the objective of maintaining a high precision even at changing temperatures, and of better ensuring the long-term constancy of the precision.

This objective is attained by the elements described in Claim 1, or Claim 11 respectively.

DESCRIPTION OF THE PREFERRED EMBODIMENT

Figure 1:
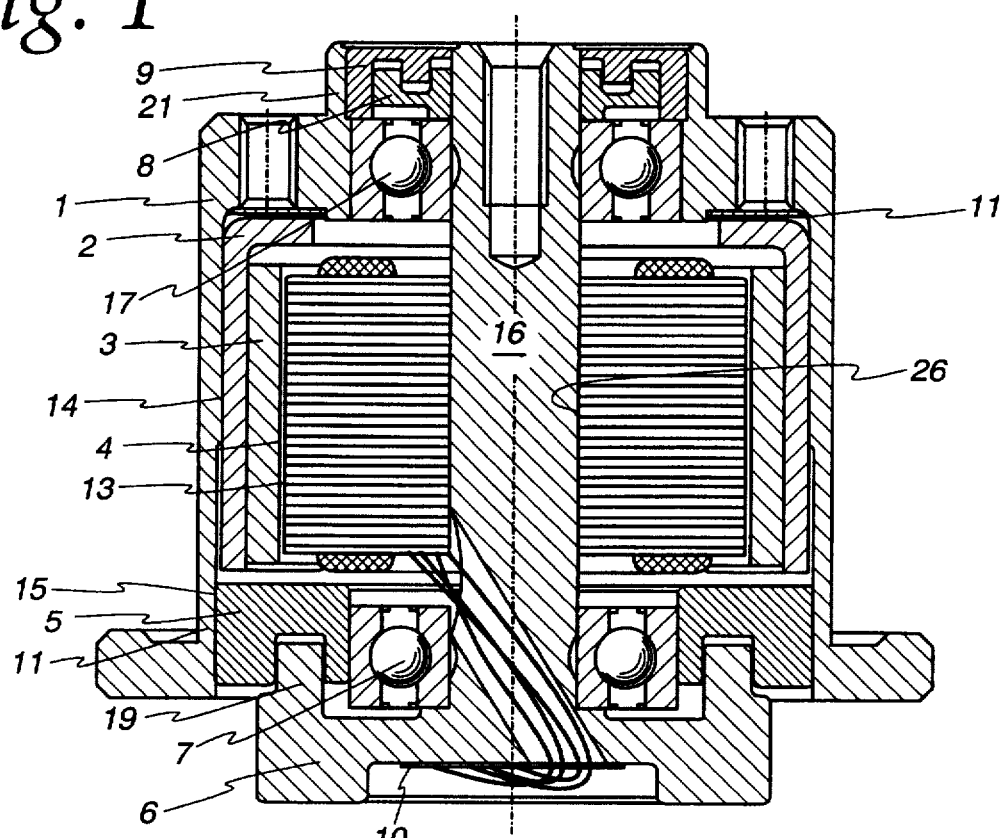
FIGS. 1 and 2 show examples of the invention in the form of sectional representations that are described in detail in the following.

In regard to the bearings, the stator laminated core and the rotor magnet, FIG. 1 illustrates one application example of the invention with a motor structure that is arranged nearly symmetrical to the axial center plane of the stator laminated core.

The disk storage drive is provided with a hub (1) which has a hat-shaped cross sectional profile and is manufactured from aluminum or another light metal. The hub (1) is attached onto a keeper ring (2) whose upper end is bent at a right angle. The hub (1) and the keeper ring (2) are connected by partial bonding approximately in the axial center, for example in the area of the location (14). A rotor magnet (3) which is preferably constructed in form of a permanent magnetic ring is inserted into the pot-shaped keeper iron (2) which is constructed like a deep-drawn part, whereby the rotor magnet is separated from the inner stator by a cylindrical air gap (13), and the inner stator consists of a laminated core (4) and a winding that essentially lies in axially extending grooves of the laminated core. The stator laminated core (4) is rigidly connected to a central vertical shaft (16) by a joining gap (26), whereby an upper bearing (17) and a lower bearing (7) are pressed onto this shaft with their inner running surfaces. The central shaft (16) expands on its lower end in radial direction to form a flange (6) that serves as a retainer for the motor and simultaneously forms a labyrinth seal together with projections (19) that protrude axially into a rotating ring element (5). A labyrinth seal is formed in a similar manner on the upper end by corresponding axial projections on a sealing washer (9) that protrude towards the inside, whereby these projections engage into a correspondingly profiled stationary ring element (8) arranged above the upper bearing (17), so that the upper and lower bearings are axially sealed on the outside. The outer axial labyrinth-like sealing washer (9) rotates on the upper bearing (17), while the outer axial flanged disk (6) with its axially inward protruding projections (19) is stationary on the lower end.

The central shaft (16) whose lower diameter is strongly enlarged and thus forms the flange (6) is manufactured from a light metal such as an aluminum alloy. It carries the inner bearing race of the bearings (17 and 7) on the upper and lower ends, while the outer bearing race of the lower bearing (7) engages into the high-precision ring element (5) and is connected with the same in a nonrotating manner. The ring element (5) consists of the same material as the shaft (16) or a different material with the same heat expansion.

The ring element (5) has very exactly dimensioned cylindrical inner and outer surfaces, whereby the outer surface (15) serves as a receptacle for the hat-shaped hub part (1) with the cylindrical inner wall at the lower open end. The hub part (1) consists of a material with equal or similar heat expansion as the heat expansion of the ring element (5). The hub (1) has an opening with a very exact cylindrical inner surface on its upper base that is connected with the outer race of the upper bearing (17) in a nonrotating manner. An axially protruding collar (21) connected to the same carries the rotating sealing washer (9).

For reasons of economy and manufacturing technology, the hub (1) is advantageously manufactured from a light metal alloy. It is very important that a closed metal circuit, so to speak, which has a similar heat expansion behavior be arranged around the upper and lower bearings similar to a closed magnetic circuit. This means that the precision can be maintained relatively well even at changing temperatures.

Figure 2:
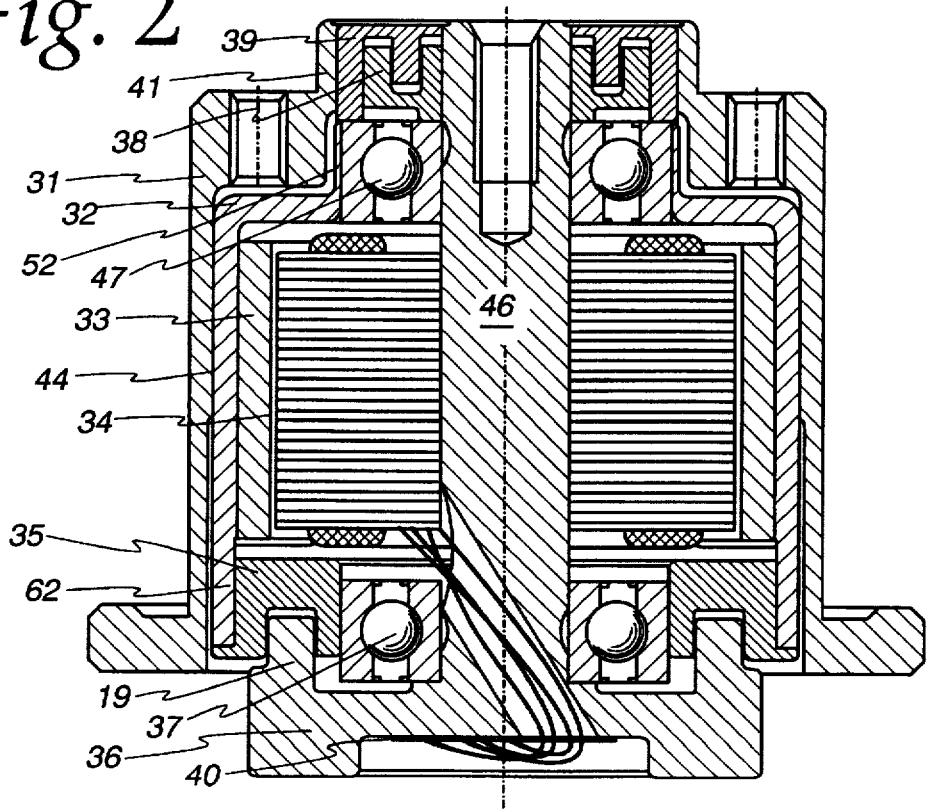

The same is also valid for the example according to FIG. 2 which differs from the example according to FIG. 1 by the fact that a virtual "steel heat-expansion circuit" is provided. A central vertical shaft (46) expands radially on its lower end to form a flange (36) and is manufactured from steel, for example as an automatically turned part, and the cylinder surface of the central shaft (46) carries a bearing (47) on the top and a bearing (37) on the bottom. The outer race of the upper bearing (47) is connected concentrically, at high precision, and in a nonrotating manner with a low-retentivity keeper part (32) by the fact that this keeper part (32) is provided with an axially protruding collar (52) on the upper end that serves as receptacle for the outer race of the bearing (47). A ferromagnetic iron or steel part (35) constructed in accordance with the ring element (5) consisting of aluminum in FIG. 1 is attached to the outer race of the lower bearing (37) in the area of the lower edge (62) of the milk can-shaped deep-drawn part (32), whereby the inner race of the lower bearing (37) is arranged on the outer surface of the centrally arranged stationary and ferromagnetic shaft (46) which is exactly machined in the area of the bearings.

Structural elements (31,33,34,38,39,41 and 44) in FIG. 2 correspond with the structural elements (1,3,4,8,9,14 or 21) in FIG. 1 and thus do not require further explanation. FIG.

2 thus represents a more complete heat expansion circuit than FIG. 1 since the bearings (7 and 17) consisting of steel are in FIG. 1 arranged within the virtual "aluminum circuit" consisting of the parts (1,5,16).

The so-called aluminum circuit that encompasses the bearings in FIG. 1 is altogether somewhat more economical in regard to its manufacture than the even more precise so-called steel circuit in FIG. 2 which, however, is probably somewhat more demanding as far as manufacturing technology is concerned.

We claim:

1. A disk storage drive with a brushless driving motor, comprising:

a stationary shaft defining an axis;

a stator comprising a laminated core disposed on the stationary shaft and a stator winding having an axial length;

an outer rotor including a bell-shaped outer rotor housing having an open end, a permanent magnetic rotor magnet and a storage disk carrying hub mounted to the outer rotor for carrying at least one storage disk in a clean room; and a bearing arrangement for rotatably mounting said rotor to the stationary shaft and comprising
      a first bearing having an inner race disposed on the stationary shaft above the stator winding and an outer race disposed within and in contact with a relatively closed end of the bell-shaped outer rotor housing for rotatably mounting the outer rotor housing and the hub to the stationary shaft whereby the outer rotor housing encompasses the stator and forms a cylindrical air gap therewith,
      a second bearing having an inner race disposed on the stationary shaft below the stator winding and having an outer race; and
      a ring element disposed between the outer race of the second bearing and an inner surface of the open end of the bell-shaped outer rotor housing for bracing the open end of the bell-shaped outer rotor housing, said ring element consisting of material having substantially the same heat expansion characteristics as the bell-shaped outer rotor.

2. A disk storage drive according to claim 1, wherein the stationary shaft consists of a material having essentially the same heat expansion characteristics as the material of the rotor housing and the material of the ring element.

3. A disk storage drive according to claim 1, wherein the stator winding and the rotor magnet interacting with the same are held to at least two thirds of their axial longitudinal extent within the space enclosed by the disk carrier section of the hub.

4. A disk storage drive according to claim 1, wherein the hub consists of nonferromagnetic material.

5. A disk storage drive according to claim 4, wherein the hub consists of a light metal.

6. A disk storage drive according to claim 1, wherein the rotor housing is a low-retentivity keeper part of the rotor.

7. A disk storage drive according to claim 6, wherein the low-retentivity keeper part carries an attached non-ferromagnetic hub.

8. A disk storage drive according to claim 1, wherein the stationary shaft comprises a flange that is suitable for mounting the drive.

9. A disk storage drive according to claim 8, wherein the ring element is at least approximately aligned in axial direction with the flange.

10. A disk storage drive according to claim 8 comprising a labyrinth seal between the flange and the ring element.

11. A disk storage drive according to claim 1, wherein labyrinth seals are provided axially above the first bearing and axially below the second bearing.

12. A disk storage drive according to claim 1, wherein the ring element that carries part of the bearing arrangement is inserted into the outer rotor housing.

13. A disk storage drive with a brushless driving motor, comprising:

a stationary shaft defining an axis;

a stator comprising a laminated core disposed on the shaft and a stator winding having an axial length;

a bell-shaped outer rotor housing having an open end and comprising a permanent magnetic rotor magnet and a storage disc carrying hub for carrying at least one storage disc in a clean room; and a bearing arrangement for rotatably mounting said rotor housing to the stationary shaft and comprising
      a first bearing having an inner race disposed on the stationary shaft above the stator winding and an outer race disposed within and supporting a relatively closed end of the bell-shaped outer rotor housing for rotatably mounting the outer rotor housing to the stationary shaft whereby the outer rotor housing encompasses the stator and forms a cylindrical air gap therewith,
      a second bearing having an inner race disposed on the stationary shaft below the stator winding and having an outer race; and
      a ring element disposed between the outer race of the second bearing and in contact with an inner surface of the open end of the bell-shaped outer rotor housing for bracing the open end of the bell-shaped outer rotor housing, said ring element having substantially the same heat expansion characteristics as the bell-shaped outer rotor contacted thereby, the open end of the bell-shaped outer rotor housing comprising a low retentivity keeper part which is braced by said ring element and said ring element having substantially the same heat expansion characteristics as the keeper part.

* * * * *

Disclaimer 5,594,606—Helmut Hans and Jurgen Oelsch, both of St. Georgen, Germany. DISK STORAGE DRIVE FOR MAINTAINING PRECISION DURING THERMAL VARIATIONS. Patent dated Jan. 14, 1997. Disclaimer filed April 24, 1997, by the assignee, Papst Licensing GmbH.

The term of this patent subsequent to April 24, 1997, has been disclaimed.
*(Official Gazette, September 9, 1997)*